(12) United States Patent
Nayak et al.

(10) Patent No.: US 12,481,432 B1
(45) Date of Patent: Nov. 25, 2025

(54) HOST AND DUAL WRITE METHOD FOR AVOIDING DATA LOSS WHEN WRITING TO AN EXTERNAL DATA STORAGE DEVICE

(71) Applicant: Sandisk Technologies, Inc., Milpitas, CA (US)

(72) Inventors: Dattatreya B. Nayak, Udupi (IN); Narendra Bayanaboina, Mydukur (IN); Nagaraj Dandigenahalli Rudrappa, Davangere (IN); Silky Mohanty, Bangalore (IN); Ramanathan Muthiah, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/825,264

(22) Filed: Sep. 5, 2024

(51) Int. Cl.
*G06F 3/06* (2006.01)

(52) U.S. Cl.
CPC .......... *G06F 3/0619* (2013.01); *G06F 3/0655* (2013.01); *G06F 3/067* (2013.01)

(58) Field of Classification Search
CPC ....... G06F 3/0619; G06F 3/067; G06F 3/0665
See application file for complete search history.

(56) References Cited

U.S. PATENT DOCUMENTS

| | | | |
|---|---|---|---|
| 7,849,365 B2 | 12/2010 | Herman | |
| 8,544,424 B2 | 10/2013 | Chang et al. | |
| 8,775,480 B2 | 7/2014 | Carson et al. | |
| 9,891,847 B2 | 2/2018 | Ravimohan et al. | |
| 9,996,457 B2 | 6/2018 | Post et al. | |
| 10,153,046 B1 | 12/2018 | Agarwal et al. | |
| 11,036,407 B1 | 6/2021 | Tikoo et al. | |
| 11,409,672 B2* | 8/2022 | Zheng | G06F 13/1626 |
| 2010/0293321 A1 | 11/2010 | Weingarten | |
| 2014/0006859 A1* | 1/2014 | Ryu | G06F 11/106 |
| | | | 714/21 |
| 2015/0280865 A1* | 10/2015 | Wood | H04L 1/1809 |
| | | | 714/748 |
| 2016/0098213 A1 | 4/2016 | Franceschini et al. | |
| 2021/0255803 A1* | 8/2021 | Kanno | G06F 3/061 |
| 2022/0155999 A1 | 5/2022 | Sikarwar et al. | |
| 2023/0153125 A1* | 5/2023 | Subramanian | G06N 10/40 |
| | | | 718/102 |

* cited by examiner

*Primary Examiner* — Mark A Giardino, Jr.
(74) *Attorney, Agent, or Firm* — Crowell & Moring LLP (57) ABSTRACT

A host may not have a large enough internal non-volatile memory to store generated data, such as video. In such situations, the host can store the data in an external data storage device, such as an external solid-state drive (SSD). However, if the storage rate of the external data storage device drops below the rate at which the host is generating and sending the data to the external data storage device, data loss can occur. To help avoid this situation, the host can use a dual-write method in which a portion of the data is both sent to the external data storage device for storage and written in the host's internal non-volatile memory. That way, if the portion of the data sent to the external data storage device is lost, the portion of the data can be resent from the host's internal non-volatile memory.

20 Claims, 10 Drawing Sheets

| Start FMU (4 bytes) | Length (2 bytes) |
|---:|---:|
| 1 | 8 |
| 256 | 8 |
| 512 | 8 |
| 768 | 8 |
| 1024 | 8 |
| ... | ... |
| ... | ... |
| ... | ... |
| ... | ... |
| ... | ... |
| ... | ... |

HOST AND DUAL WRITE METHOD FOR AVOIDING DATA LOSS WHEN WRITING TO AN EXTERNAL DATA STORAGE DEVICE

BACKGROUND

A data storage device can be used to store data from a host. In some situations, an external data storage device (e.g., an external solid-state drive (SSD)) is used to store data that requires more storage capacity than available in the host.

DETAILED DESCRIPTION

The following embodiments generally relate to a host and dual write method for avoiding data loss when writing to an external data storage device. In one embodiment, a method is provided that is performed in a host in communication with an external data storage device. The method comprises: sending a portion of data generated by the host to the external data storage device for storage; determining whether a data generation rate of the host is greater than a storage rate of the external data storage device; and in response to determining that the data generation rate of the host is greater than the storage rate of the external data storage device: storing, in a non-volatile memory of the host, a copy of the portion of the data sent to the external data storage device for storage; determining whether the portion of the data was received by the external data storage device; in response to determining that the portion of the data was not received by the external data storage device, sending the copy of the portion of the data to the external data storage device for storage; and in response to determining that the portion of the data was received by the external data storage device, removing the copy of the portion of the data from the non-volatile memory of the host.

In another embodiment, a host is provided comprising a non-volatile memory; a first volatile memory; a second volatile memory; and one or more processors. The one or more processors, individually or in combination, are configured to: store a portion of data generated by the host in the first volatile memory for transfer to an external data storage device for storage; store the portion of data generated by the host in the second volatile memory for transfer to the non-volatile memory; determine whether the portion of the data transferred to the external data storage device was dropped; and in response to determining that the portion of the data transferred to the external data storage device was dropped, send, to the external data storage device for storage, the portion of data that is stored in the non-volatile memory.

In yet another embodiment, a host is provided comprising: a non-volatile memory; and means for: sending a portion of data generated by the host to an external data storage device for storage; storing, in the non-volatile memory of the host, a copy of the portion of the data sent to the external data storage device for storage; and sending the copy of the portion of the data to the external data storage device for storage if the portion of data was not successfully stored in the external data storage device.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figures 1A, 1B:
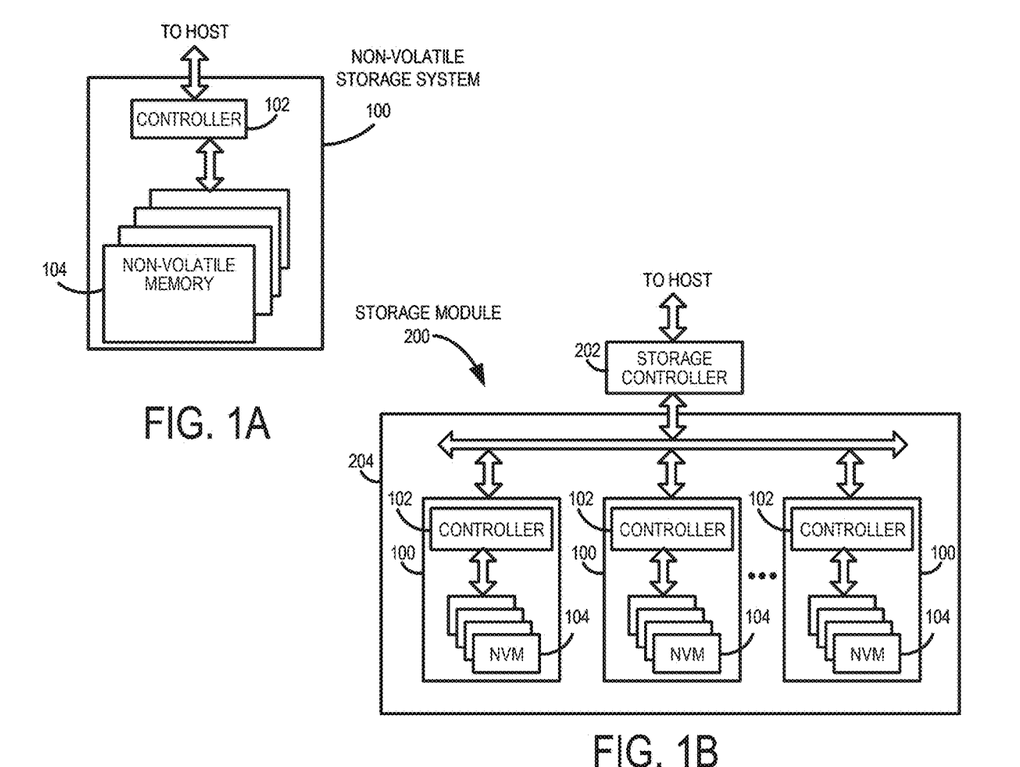
FIG. 1A is a block diagram of a data storage device of an embodiment.
FIG. 1B is a block diagram illustrating a storage module of an embodiment.
Figure 1C:
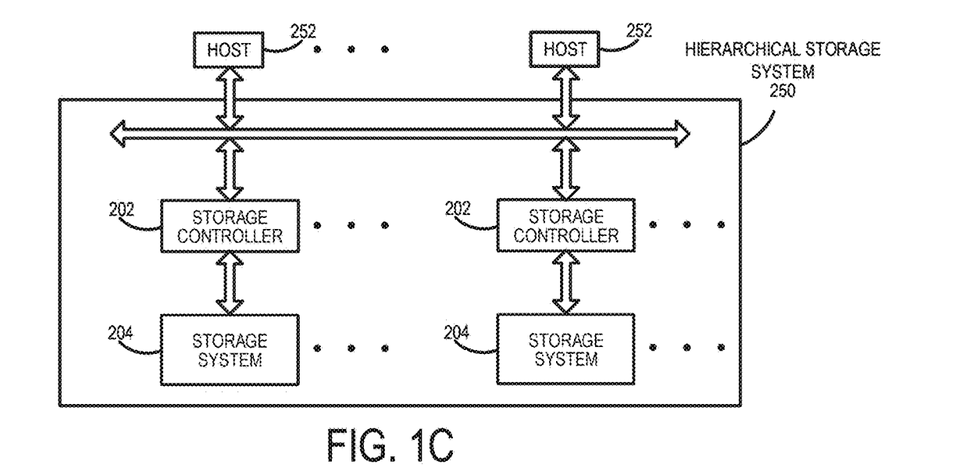
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
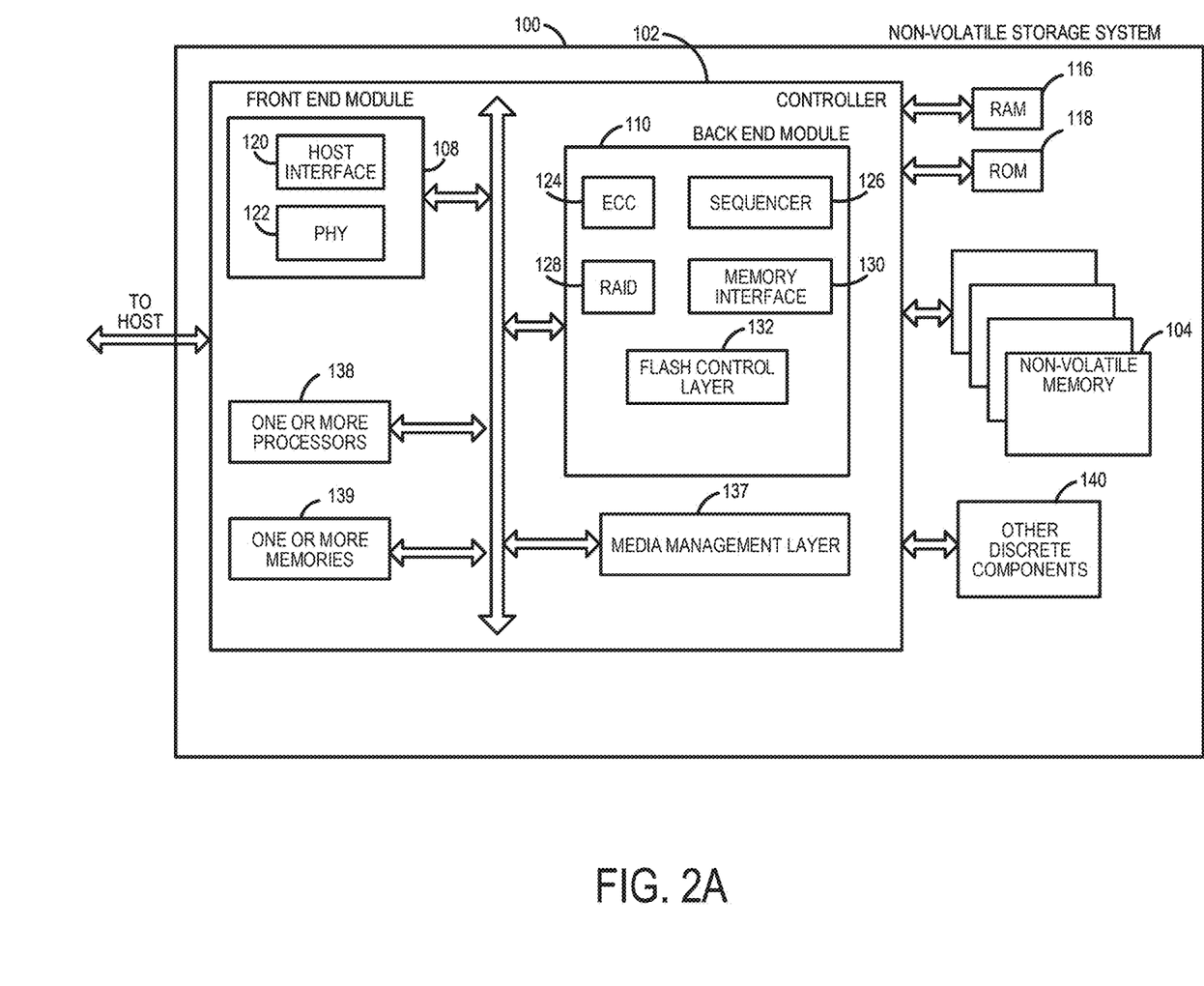
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
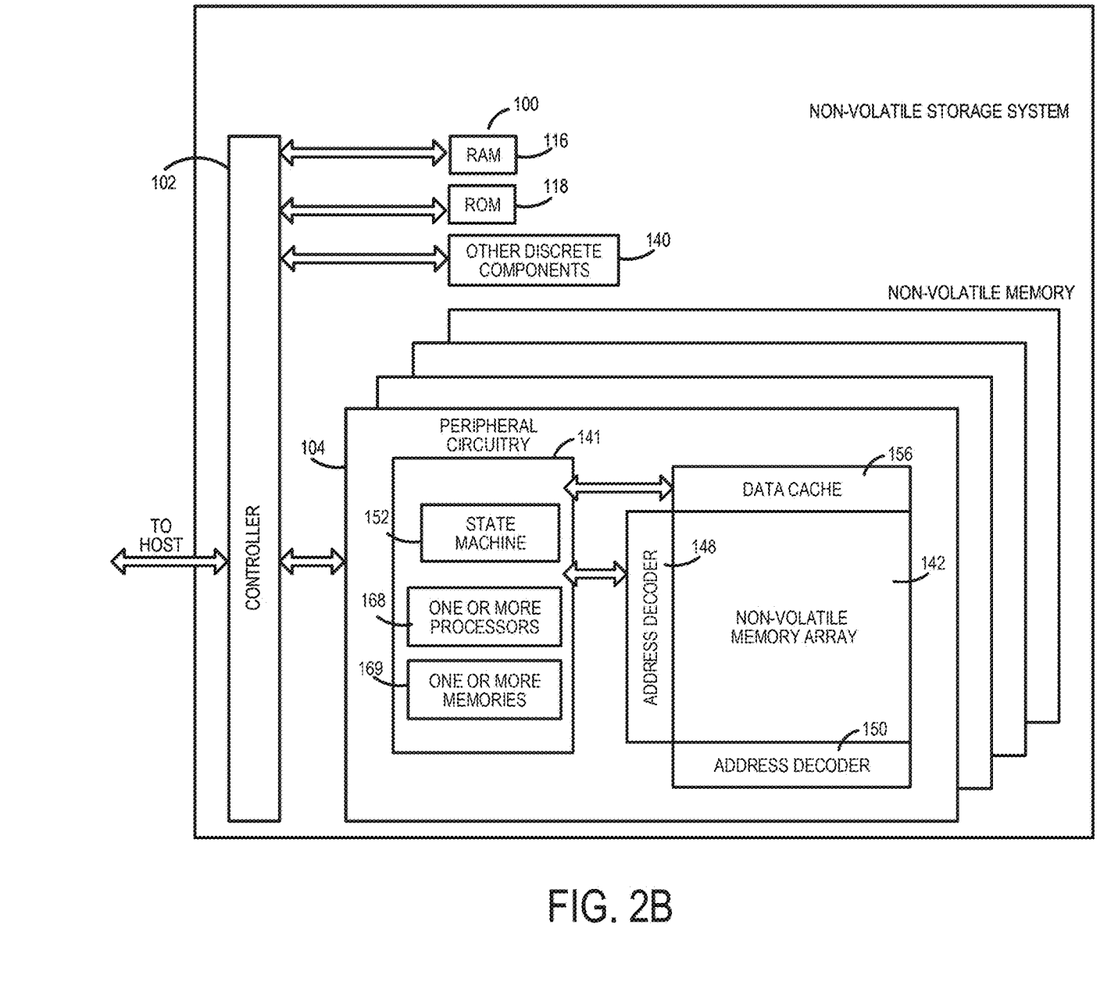
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
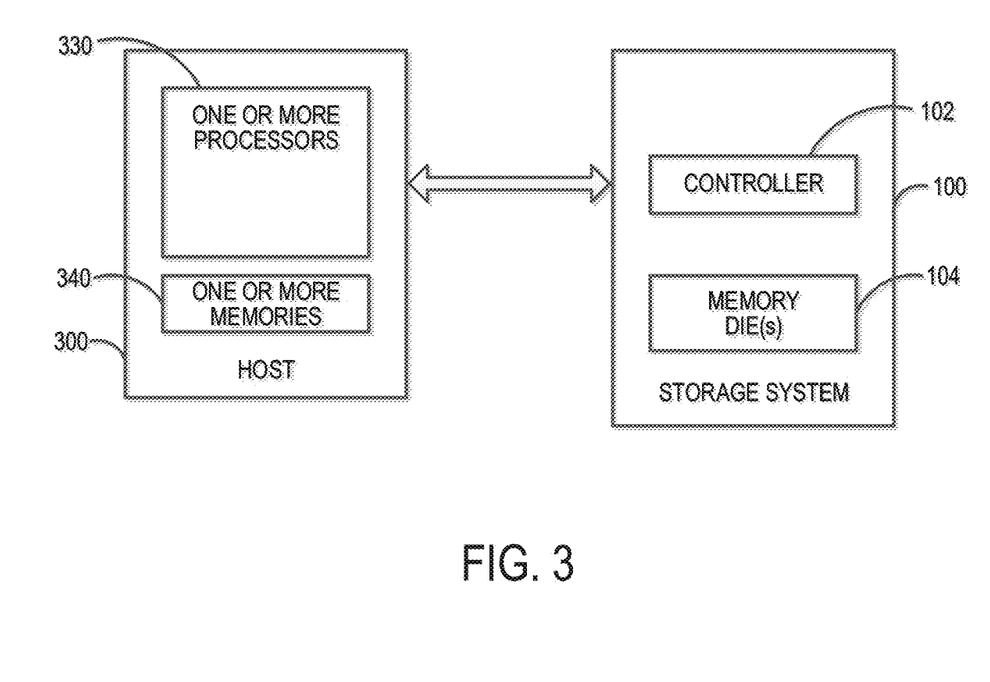
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, a data storage device can be used to store data from a host. In some situations, an external data storage device (e.g., an external solid-state drive (SSD)) is used to store data that requires more storage capacity than available in the host. For example, a mobile device's internal non-volatile memory may not be large enough to store a video that requires a relatively-large amount of storage space. In such situations, video recorded in real-time by the mobile device can be flushed (from the host's internal volatile memory) to an external data storage device, such as an external solid-state drives (SSD). This enables direct video recording storage by the mobile device to the SSD when the mobile device's non-volatile internal memory is not used to store the video. This is illustrated in the example shown in FIG. 4.

Figure 4:
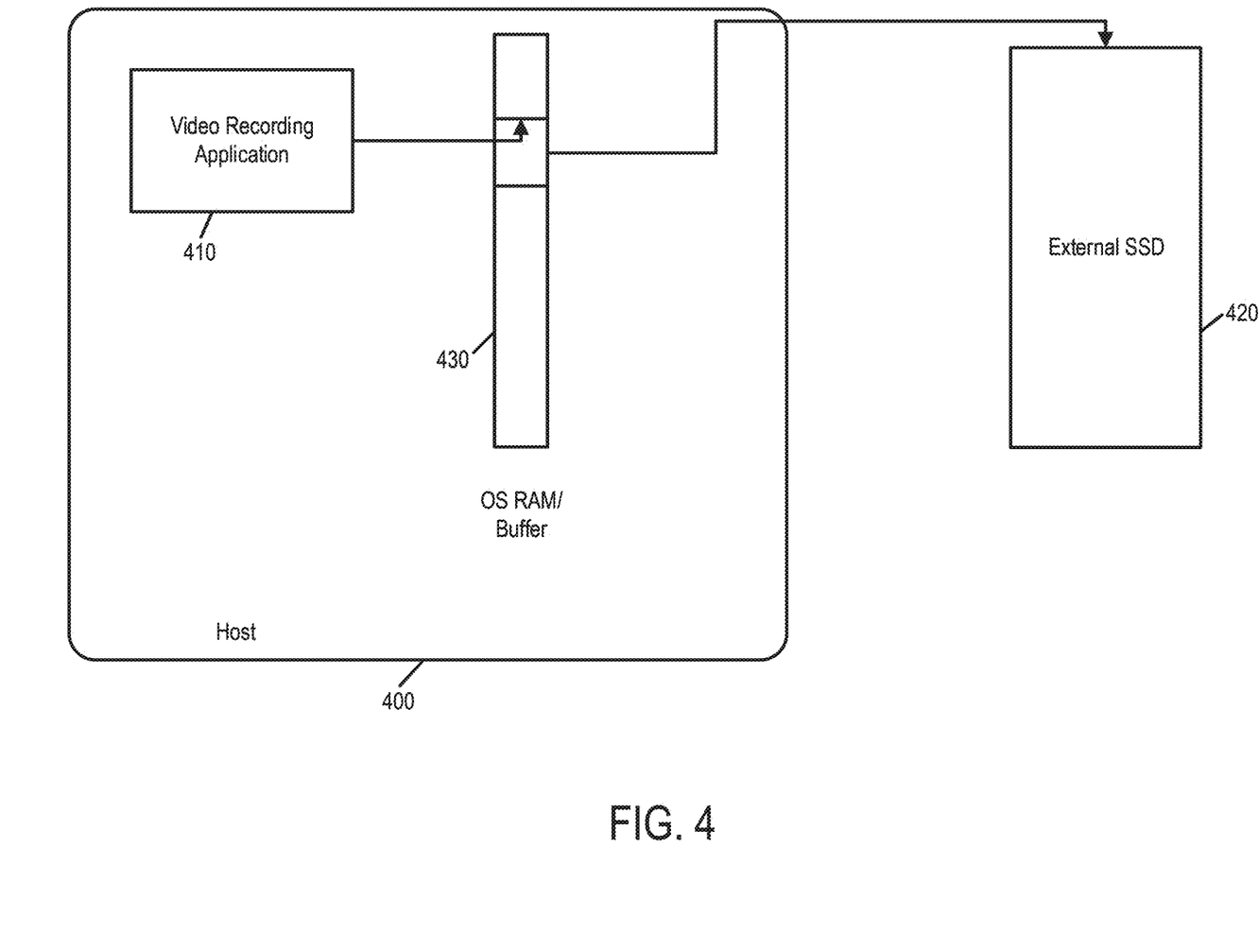
FIG. 4 is a block diagram of a direct storage architecture of an embodiment.

As shown in FIG. 4, the host 400 (e.g., a mobile phone) has a video recording application 410 that records approximately 1.8 TB of data in two hours (i.e., a 4K 60 frames-per-second (fps) recording). In this example, the host's internal non-volatile memory (not shown) is not large enough to store this video, so the host 400 directly stores the video in an external SSD 420. It should be noted that while the host's non-volatile internal memory is not used to store the video in this direct storage environment, the video can be temporarily stored (e.g., as the video is being recorded) in the host's volatile memory 430 (here, an operating system (OS) RAM/buffer) on its way to the external SSD 420.

The direct storage architecture in FIG. 4 can encounter several problems. For example, the host's video recording application 410 is continuously writing data into the OS buffer 430 at a certain rate. So, if the external SSD 420 cannot keep up with this rate, existing data in the OS buffer 430 can be overwritten with new data before the existing data can be written to the external SSD 420. Consider the example in which the external SSD 420 has an average write sustained performance rate of X MBPS. If, for any reason, the external SSD 420 drops below a minimum performance rate for a glitch-free recording, there is a possibility that the OS buffer 430 will be overwritten with new data from the video recording application 410. The video recording application 410 and the OS buffer 430 do not have a back-pressure mechanism to slow down the data production rate because the video recording application 410 is recording video in real time (e.g., a live-stream sports event). So, when this situation arises, frames are dropped due to buffer overwrites, which result in data loss when the user plays back the video and, therefore, a bad user experience. As shown by this example, the continuity of usage of the external SSD 420 can be based on its internal state, where continuity of usage refers to the external SSD 420 not receiving the video frame because it is operating slowly (as opposed to incorrectly returning data).

The following embodiments can be used to address this situation. In one embodiment, the host performs first-level buffering in an internal non-volatile memory (e.g., NAND) alongside second-level buffering by copying the same data into an internal volatile memory (e.g., OS/RAM buffer) that interfaces an external data storage device. (In the below example, the or table external data storage device is a portable external SSD, but it should be understood that any suitable type of external data storage device can be used.) In this way, "missed data" (i.e., data not written to the external data storage device due to buffer overflow) is still stored in the internal non-volatile memory and, thus, available for storage in the external data storage device after the actual streaming (e.g., using a hash sanitization method). The host can release the data in the internal non-volatile memory once the external data storage device acknowledges the write command. This leverages a dual-write host mechanism: one write is made internally to the internal non-volatile memory, and another (duplicate) write is made externally to the external data storage device. The first write can be deallocated after the second write is confirmed. The system can employ hashing techniques at a logical block address (LBA) (e.g., one sector) or flash management unit (FMU) (e.g., eight sector) granularity to determine if the data was stored successfully in the external data storage device. Based on that, the host can determine if the copy from the internal non-volatile memory to the external data storage device is required to compensate for the loss. The hashing can be used to confirm if data corruption due to the buffer overflow happened.

Several techniques can be used to address the increase in write amplification that can be associated with this method. For example, the host can determine that the average bit rate is higher than the bit rate that can be handled by the external data storage device (e.g., as per its specification, vendor feedback, or dynamic buffer monitoring) and can determine whether to perform a secondary write into the internal non-volatile memory when it foresees a risk of media frame drops. That is, only when the bit rate is high does the host use dual copy (one into the internal non-volatile memory and the other into the external data storage device). On the other hand, if the bit rate is such that the risk of buffer overflow is not there (e.g., less than a threshold bit rate), the system can take the default route of just writing to the external data storage device. This way, the increased write amplification has a justification. The hashing method can be used only for the LBAs that were impacted by the high bit-rate stream.

The internal volatile memory (e.g., copy buffer) is optionally connected to an SLC cache of the internal non-volatile memory, so that it is always reliable and fast. The capacity issue with the internal non-volatile memory can be addressed by performing a trim as soon as the hashing verification passes, thereby releasing the blocks. An SLC cache can also provide high write cycles, which can properly suit the needs of the video recording application.

Figure 5:
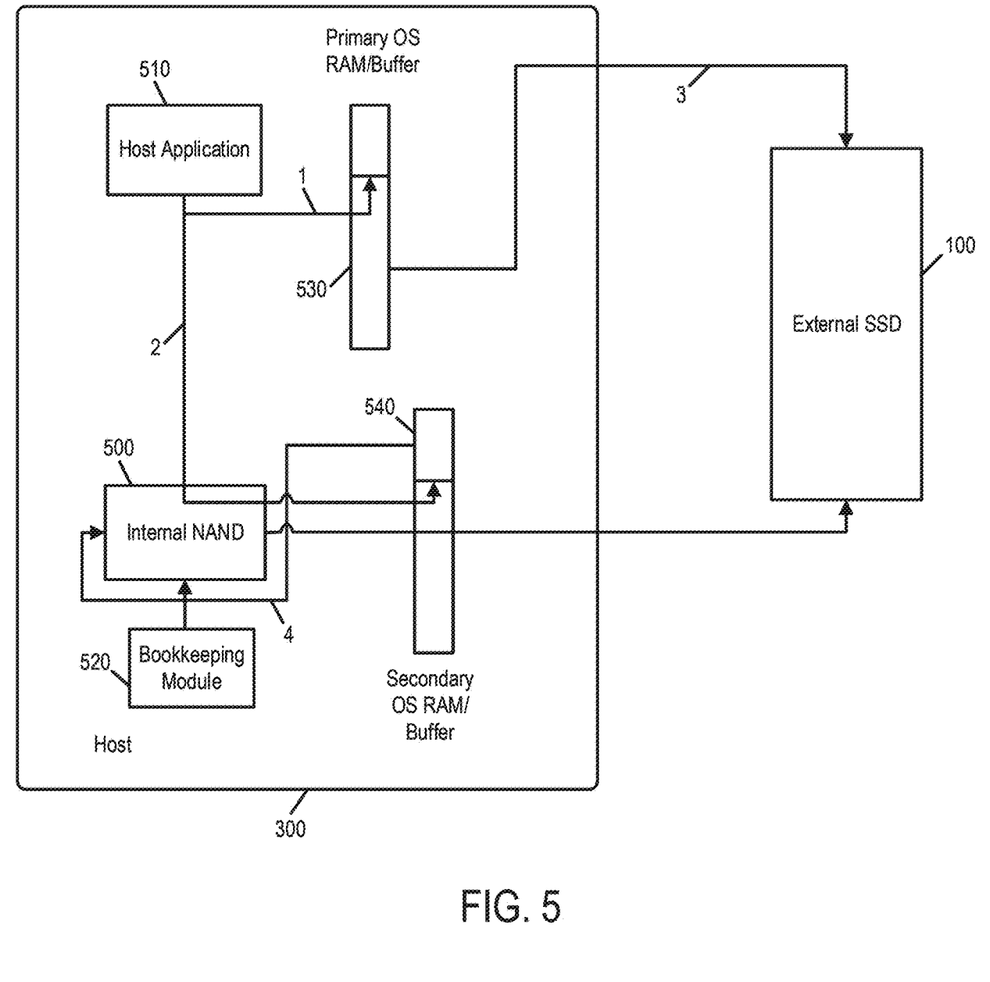
FIG. 5 is a block diagram of a storage architecture of an embodiment.

Turning again to the drawings, FIG. 5 is a block diagram of a storage architecture that will be used to illustrate an example implementation of the embodiment described above. As shown in FIG. 5, in this example, the host 300 comprises internal non-volatile memory 500 (e.g., NAND), a host application 510 (e.g., a video and/or audio recording application that is stored in one or more memories and executed, individually or in combination, by one or more processors in the host 300), a bookkeeping module 520 (which can be an application also stored in one or more memories and executed, individually or in combination, by one or more processors in the host 300), a first volatile memory 530 (e.g., here, a primary OS RAM buffer), and a second volatile memory 540 (e.g., here, a secondary OS RAM buffer). (While the two volatile memories are shown as separate units, the two volatile memories can be part of the same memory unit.) The actions described below with respect to the host 300 can be performed by the one or more processors 330 of the host 300, individually or in combination.

In this example, the host application 510 writes data (e.g., live-stream video data, but any suitable type of data can be used) both to primary volatile memory 530 (act 1) and the secondary volatile memory 540 (act 2). The data written to the primary volatile memory 530 is transferred to the external data storage device 100 (in this example, an external SSD) (act 3). The data written to the second volatile memory 540 is transferred to the internal non-volatile memory 500 (act 4). Optionally, the host application 510 can write to both the primary and secondary volatile memories 530, 540 only if the bit rate of the data generated by the host application 510 is above a threshold that indicates a relatively-high risk of buffer overflow, which would warrant an increase in write amplification. (The threshold can be based on the actual or estimated storage rate of the external SSD.) After the data is written to the external data storage device 100, the controller in the external data storage device 100 can send an acknowledgement back to the host 300 for a particular LBA or LBA range. (The acknowledgement that the data was received can simply by an acknowledgement of receipt of the data or that the data was received and successfully stored.) The bookkeeping module 520 can use this information to invalidate that LBA/LBA range in the internal non-volatile memory 500 (e.g., invalidating an entry in a logical-to-physical address table associated with a logical address of the data). (Instead of trimming, any other form of removing the data can be used, such as, but not limited to, physically erasing or overwriting the data.) Also, the host 300 can periodically trigger a valid-LBA data flush from the internal non-volatile memory 500 to the external data storage device 100 to help ensure data is not lost (e.g., that video frames are not dropped).

Figure 6:
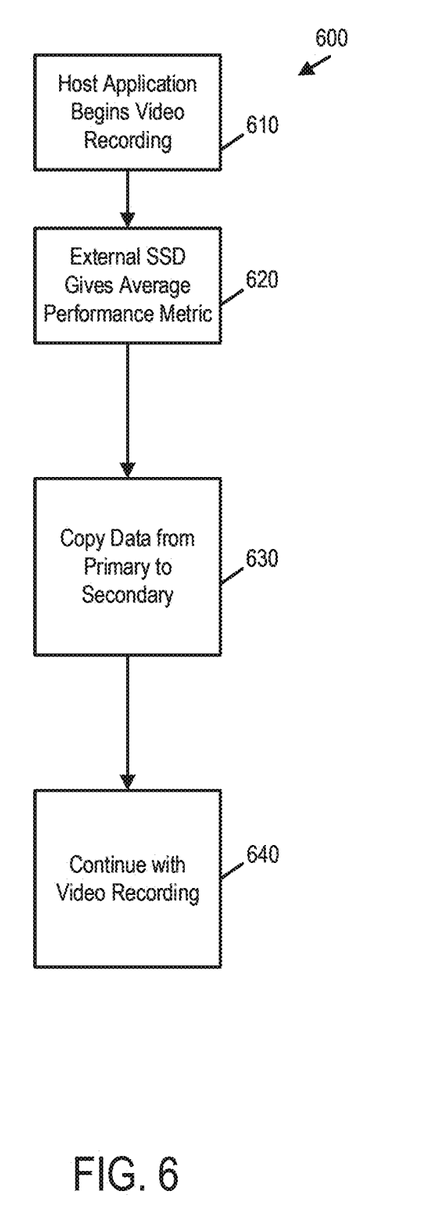
FIG. 6 is a flow chart of a dual-write method of an embodiment.
Figure 7:
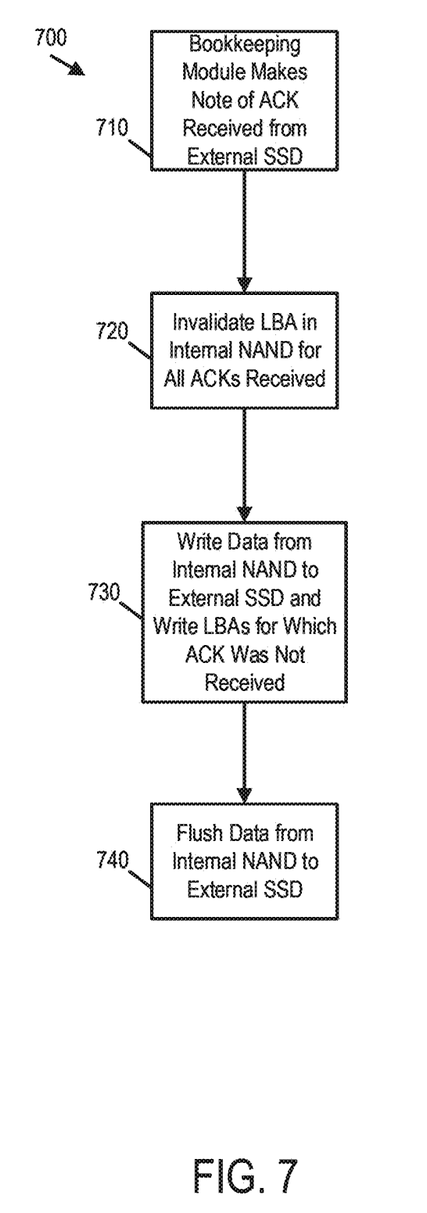
FIG. 7 is a flow chart of a bookkeeping method of an embodiment.

FIGS. 6 and 7 are flow charts 600, 700 that illustrate some of the steps of the above processes. As shown in FIG. 6, the host application 510 begins video recording (610), and the external data storage device 100 provides an average performance metric (620) (in other embodiments, the actual performance/storage rate is used). If the bit rate of the generated video is greater than a threshold based on this metric, the host 300 copies the data from the primary volatile memory 520 to the secondary volatile memory 540 for storage in the internal non-volatile memory 500 (630) and continues with the recording (640). When the data is streaming data (e.g., video data), the data sent to the external data storage device 100 and the copy sent to the internal non-volatile memory 500 is only a portion of the total data generated by the host application 510 (e.g., a portion of the total video), as, in this example, the internal non-volatile memory 500 does not have the capacity to store the entirety of the data (e.g., video).

Also, as shown in FIG. 7, when the host 300 receives acknowledgement from the external data storage device 100, the bookkeeping module 520 makes note of the acknowledgement (710) and invalidates the LBA in the internal non-volatile memory 500 (e.g., trims the copy of the data) (720). The host 300 then writes data, from the internal non-volatile memory 500 to the external data storage device 100, data for which an acknowledgement was not received (730). The host 300 can then flush the data from the internal non-volatile memory 500 to the external data storage device 100 (740).

Figure 8:
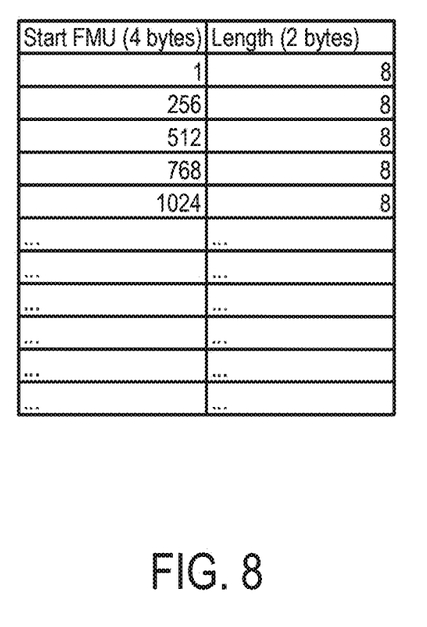
FIG. 8 is an illustration of an example hash table of an embodiment.

Turning now to another embodiment, there is a chance that the host 300 anticipated that the external data storage device 100 would drop data, but the external data storage device 100 actually stored—and did not drop—the data. A hashing mechanism can be used to address this situation. More specifically, to avoid duplicate writing of the same LBA range, the controller in the external data storage device 100 can employ a hash table (or other type of data structure) where each entry of the table contains the FMU and the number of sequential FMUs written (in this example, one FMU equals eight LBAs). Whenever the host 300 issues writes to the external data storage device 100, it can record the starting FMU and length of command details in the hash table. FIG. 8 shows an example hash table of an embodiment.

Further, the controller in the external data storage device can use certain filtering mechanisms to prevent file system writes to entries in this table as the file system writes are not sequential and would need more entries in the hash table if allowed. One such filtering mechanism can be to check the length of the command and allow only those commands whose command length is greater than a certain threshold (e.g., one to 50 FMUs). Further to save on RAM requirements for the hash table, the length field of the entry can be saved as two to the power of length. For example, if the host 300 wrote 256 FMUs starting from FMU number 0, the corresponding entry in the hash table can be: FMU=0, Length=8, where $2^8$=256. Since the host 300 writes sequential data, in all likelihood, the next host write starts from FMU number 256 and writes 256 FMUs. The entry corresponding to the same can be: FMU=256, Length=8, where $2^8$=256.

Regarding the RAM requirements of one entry, the FMU field can be allocated four bytes as per a standard, and the length field can be allocated two bytes. So, one entry in this table can address 128 MB in the best case (assuming that streaming data would be sequential and with the file system data filtering mechanism in place, this should be possible most of the time). The calculation behind 128 MB is as follows:

1<<15=32768, where 15 is the maximum length of one entry.

32768*4 k/1024 k=128 MB. That makes six bytes per entry.

To address 1 GB in the best case, eight entries are used, and 48 bytes are required. A new entry in the table can be made when the sequential writes exceed 128 MB or when the sequentially is broken.

Regarding the size of the hash table, to address 1 TB logical space, the table size can be 48*1000=48000 bytes or 48 MB. To further optimize RAM overhead, one can choose not to maintain the entries for the entire logical space. Rather one can choose to maintain the entries for some T seconds worth of data and keep updating it after every T seconds, assuming that the host would flush the data from internal storage within this T seconds. For T=10 seconds, at 220 MBPS rate, the host would write 2.2 GB of data. This would mean ~18 entries in the table, where one entry=128 MB. The RAM requirement would then be 18*6=108 bytes, which is very economical. It should be noted that the RAM requirement of the hash table can be directly proportional to time T.

In another embodiment, duplicate searching logic is used. In this embodiment, when the host anticipates a potential frame drop in the external SSD, the host can store the data in its internal storage, which the host can flush periodically. When the host flushes the data from internal storage, the controller in the external SSD can see if this LBA range is present in the hash table. If the hash table has an entry for this LBA range, the controller in the external SSD device can skip writing that LBA range. If partial data of this LBA range is present in the table (e.g., out of 256 FMUs write requested from internal storage, the table has entry for 128 FMUs), the controller of the external SSD can write a pending portion of the LBA range only. To optimize further, this logic can be triggered only when the host write is coming from internal storage.

Figure 9:
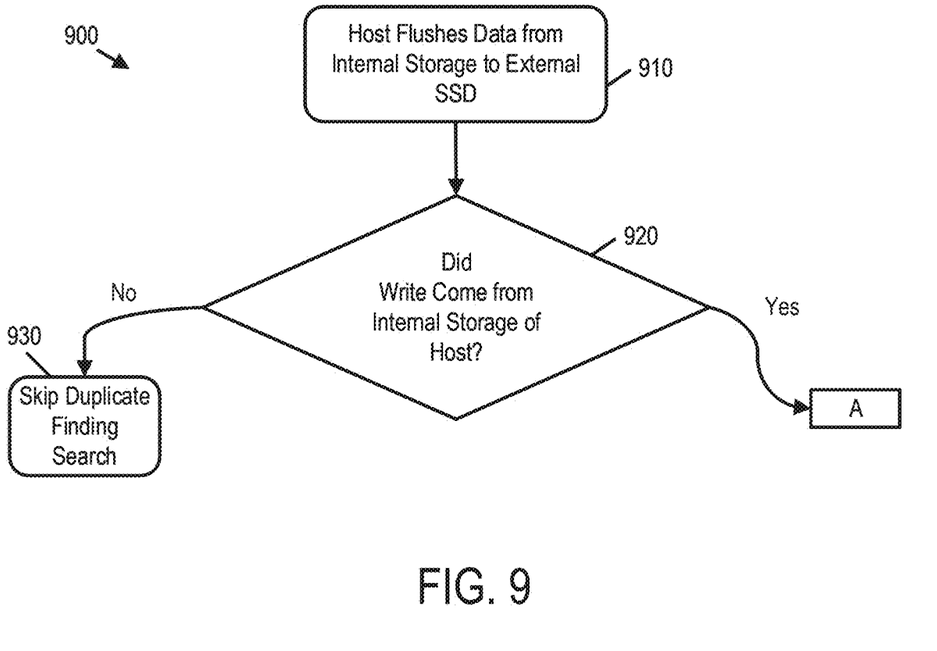
FIGS. 9 and 10 are flow charts of an algorithm that can be used to find duplicate writes.
Figure 10:
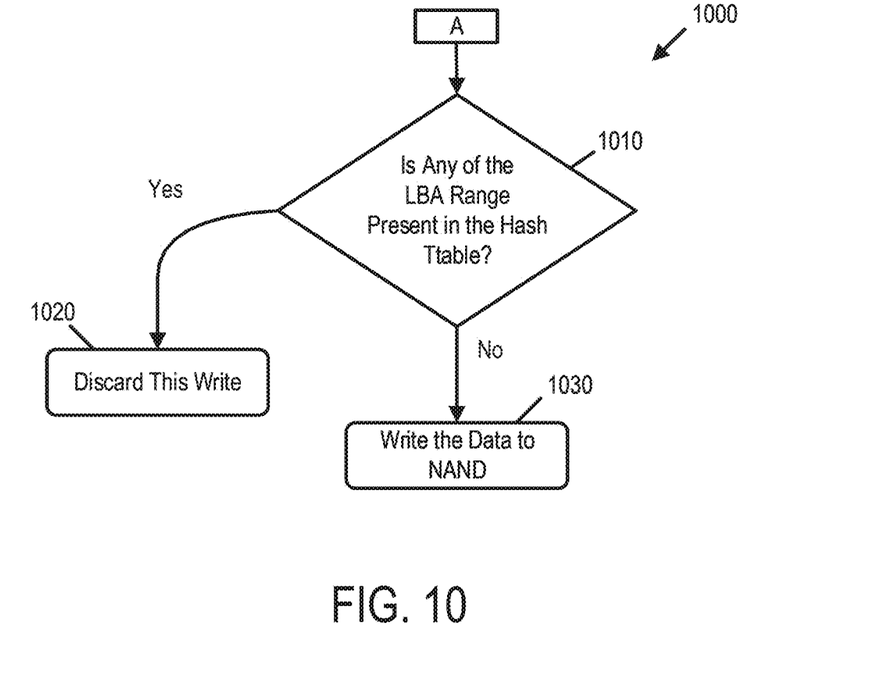

FIGS. 9 and 10 are flow charts 900, 1000 that illustrate an algorithm to find duplicate writes. As shown in FIG. 9, the host flushes data from internal storage to an external SSD (910). The controller of the external SSD determines whether the data came from internal storage of the host (920). If it didn't, the external SSD skips a duplicate finding search (930). However, if it did (see FIG. 10), the controller of the external SSD determines if any of the LBA range is present in the hash table (1010). If it isn't, the controller of the external SSD discards the write (1020). If it is, the controller of the external SSD writes the data to the NAND (1030).

There are several advantages associated with these embodiments. For example, these embodiments can be used to help provide a glitch-free video recording by avoiding dropping data due to reduced write speed during heavy workloads. Further, these embodiments can be used to help ensure a good user experience in video recording applications and improve quality of service of the data storage device.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. In a host in communication with an external data storage device, a method comprising:
   sending a portion of data generated by the host to the external data storage device for storage;
   determining whether a data generation rate of the host is greater than a storage rate of the external data storage device; and
   in response to determining that the data generation rate of the host is greater than the storage rate of the external data storage device:
      storing, in a non-volatile memory of the host, a copy of the portion of the data sent to the external data storage device for storage;
      determining whether the portion of the data was received by the external data storage device;
      in response to determining that the portion of the data was not received by the external data storage device, sending the copy of the portion of the data to the external data storage device for storage; and
      in response to determining that the portion of the data was received by the external data storage device, removing the copy of the portion of the data from the non-volatile memory of the host.

2. The method of claim 1, further comprising:
   in response to determining that the data generation rate is not greater than the storage rate of the external data storage device, foregoing storing the copy of the portion of the data in the non-volatile memory of the host.

3. The method of claim 1, wherein determining whether the portion of the data was received by the external data storage device comprises determining whether an acknowledgment was received from the external data storage device.

4. The method of claim 1, wherein the storage rate of the external data storage device comprises an average storage rate.

5. The method of claim 1, wherein removing the copy of the portion of the data from the non-volatile memory of the host comprises trimming the copy of the portion of the data by invalidating an entry in a logical-to-physical address table associated with a logical address of the copy of the portion of the data.

6. The method of claim 1, further comprising flushing the non-volatile memory of the host to the external data storage device.

7. The method of claim 1, further comprising using a hash table to avoid duplicate writing of the portion of the data in the external data storage device.

8. The method of claim 1, wherein the data comprises streaming video.

9. The method of claim 1, wherein a capacity of the non-volatile memory of the host is insufficient to store all of the data generated by the host.

10. The method of claim 1, wherein the external data storage device comprises an external solid-state drive (SSD).

11. The method of claim 1, wherein a memory of the external data storage device comprises a three-dimensional memory.

12. A host comprising:
   a non-volatile memory;
   a first volatile memory;
   a second volatile memory; and
   one or more processors, individually or in combination, configured to:
      store a portion of data generated by the host in the first volatile memory for transfer to an external data storage device for storage;
      store the portion of data generated by the host in the second volatile memory for transfer to the non-volatile memory;
      determine whether the portion of the data transferred to the external data storage device was dropped; and
      in response to determining that the portion of the data transferred to the external data storage device was dropped, send, to the external data storage device for storage, the portion of data that is stored in the non-volatile memory.

13. The host of claim 12, wherein the one or more processors, individually or in combination, are further configured to store the portion of data generated by the host in the second volatile memory for transfer to the non-volatile memory in response to determining that a data generation rate of the host is greater than a storage rate of the external data storage device.

14. The host of claim 12, wherein the one or more processors, individually or in combination, are further configured to remove the portion of the data stored in the non-volatile memory in response to determining that the portion of the data transferred to the external data storage device was not dropped.

15. The host of claim 12, wherein the one or more processors, individually or in combination, are further configured to use a hash table to avoid duplicate writing of the portion of the data in the external data storage device.

16. The host of claim 12, wherein determining whether the portion of the data transferred to the external data storage device was dropped comprises determining whether an acknowledgment was received from the external data storage device.

17. The host of claim 12, wherein the data comprises streaming video.

18. The host of claim 12, wherein a capacity of the non-volatile memory is insufficient to store all of the data generated by the host.

19. The host of claim 12, wherein the external data storage device comprises an external solid-state drive (SSD).

20. A host comprising:
   a non-volatile memory;
   a first volatile memory;
   a second volatile memory; and
   means for:
      storing a portion of data generated by the host in the first volatile memory for transfer to an external data storage device for storage;
      storing the portion of data generated by the host in the second volatile memory for transfer to the non-volatile memory;
      determining whether the portion of the data transferred to the external data storage device was dropped; and
      in response to determining that the portion of the data transferred to the external data storage device was dropped, sending, to the external data storage device for storage, the portion of data that is stored in the non-volatile memory.

* * * * *